United States Patent
Coleman

(10) Patent No.: US 10,922,801 B2
(45) Date of Patent: Feb. 16, 2021

(54) CHANNEL-BASED BINARIZATION OF COLOR

(71) Applicant: LOCKHEED MARTIN CORPORATION, Bethesda, MD (US)

(72) Inventor: Chadwick M. Coleman, Binghamton, NY (US)

(73) Assignee: Lockheed Martin Corporation, Bethesda, MD (US)

(*) Notice: Subject to any disclaimer, the term of this patent is extended or adjusted under 35 U.S.C. 154(b) by 277 days.

(21) Appl. No.: 15/654,196

(22) Filed: Jul. 19, 2017

(65) Prior Publication Data
US 2019/0026876 A1    Jan. 24, 2019

(51) Int. Cl.
| | |
|---|---|
| *G06T 5/50* | (2006.01) |
| *G06K 9/38* | (2006.01) |
| *G06K 9/46* | (2006.01) |
| *B07C 3/14* | (2006.01) |

(52) U.S. Cl.
CPC .................. *G06T 5/50* (2013.01); *G06K 9/38* (2013.01); *G06K 9/4652* (2013.01); *B07C 3/14* (2013.01); *G06T 2200/28* (2013.01); *G06T 2207/10024* (2013.01); *G06T 2207/30176* (2013.01)

(58) Field of Classification Search
CPC ......... G06T 5/50; G06T 5/00; G06T 2200/28; G06T 2200/32; G06T 2200/10024; G06T 2200/30176; G06T 2200/30168; G06K 9/38; G06K 9/36; G06K 9/4652; G06K 9/4647
See application file for complete search history.

(56) References Cited

U.S. PATENT DOCUMENTS

| | | | |
|---|---|---|---|
| 5,184,213 A | 2/1993 | Ishida | |
| 5,475,496 A | 12/1995 | Kumada | |
| 5,509,085 A * | 4/1996 | Kakutani | H04N 1/52 347/43 |
| 5,708,728 A | 1/1998 | Nomura | |
| 6,950,210 B2 | 9/2005 | Guo et al. | |
| 7,423,783 B2 | 9/2008 | Yamaguchi | |
| 7,576,888 B2 | 8/2009 | Sakai et al. | |
| 8,947,736 B2 | 2/2015 | Yu et al. | |
| 9,042,649 B2 | 5/2015 | Tian | |
| 9,514,382 B2 * | 12/2016 | Ishihara | G06K 9/48 |
| 2003/0020935 A1 | 1/2003 | Morimatsu | |
| 2012/0000983 A1 * | 1/2012 | Bhagwan | G06K 7/10851 235/462.04 |

OTHER PUBLICATIONS

Zongyi Liu, Hanning Zhou, "Segmenting texts from outdoor images taken by mobile phones using color features," Proc. SPIE 7874, Document Recognition and Retrieval XVIII, 78740B (Jan. 24, 2011).*

(Continued)

*Primary Examiner* — Dwayne D Bost
*Assistant Examiner* — Stephen M Brinich
(74) *Attorney, Agent, or Firm* — Baker Botts L.L.P.

(57) ABSTRACT

Systems and methods for generating a binary image from a color image are disclosed. A method includes: acquiring a color image; generating a first grayscale image from a first color channel in the color image and a second grayscale image from a second color channel in the color image; and generating a binary image using at least the first grayscale image and the second grayscale image.

9 Claims, 18 Drawing Sheets

(56) References Cited

OTHER PUBLICATIONS

Extended European Search Report dated Dec. 13, 2018 in related EP Application No. 18184150.3, 7 pages.
Liu et al., "Segmenting Texts From Outdoor Images Taken by Mobile Phones Using Color Features", Proceedings of SPIE, vol. 7874, Jan. 2011, 9 pages.
Kumar et al., "OTCYMIST: Otsu-Canny Minimal Spanning Tree for Born-Digital Images", 2012 10th IAPR International Workshop on Document Analysis Systems, 2012, 5 pages.
Tsai et al., "Binarization of Color Document Images via Luminance and Saturation Color Features", IEEE Transactions on Image Processing, vol. 11, No. 4, Apr. 2002, 18 pages.
Office Action dated Nov. 19, 2019 in related EP Application No. 18 184 150.3, 4 pages.
Du et al., "Unsupervised approach to color video thresholding", Optical Engineering, vol. 43 No. 2, Feb. 2004, 8 pages.
European Office Action issued in European Application No. 18184150.3-1207 dated Apr. 8, 2020, 5 pages.

* cited by examiner

US 10,922,801 B2

CHANNEL-BASED BINARIZATION OF COLOR

FIELD OF THE INVENTION

The present invention generally relates to image processing and, more particularly, to a system and method for generating a binary image from a color image.

BACKGROUND DESCRIPTION

A binary (black/white) image is typically sourced from a grayscale image. The grayscale image may be obtained by converting a color image from a color camera into grayscale, and then the grayscale image may be binarized to create the binary image. The color image may be converted to the grayscale image by combining the color intensity channels (e.g., R/G/B) in the color image into a single grayscale intensity channel. The binary image may then be generated by binarizing the single grayscale intensity channel of the grayscale image.

Postal recognition software used in mail sorting and sequencing systems may work on binary images. To obtain a binary image, a color image may be converted to a grayscale image, and a binarization process may convert the grayscale image to a binary image. However, the resulting binary image may suffer from noise, obstructed areas of interest, or specular reflection.

SUMMARY OF THE INVENTION

In an aspect of the invention, there is a method that includes: acquiring a color image; generating a first grayscale image from a first color channel in the color image and a second grayscale image from a second color channel in the color image; and generating a binary image using at least the first grayscale image and the second grayscale image.

In another aspect of the invention, there is a computer program product that includes a computer readable storage medium having program instructions embodied therewith. The program instructions are executable by a computer device to cause the computer device to: acquire a color image; generate a grayscale image from each of at least two color channels in the color image; and generate a binary image using the grayscale images.

In yet another aspect of the invention, there is a system that includes: at least one hardware processor; a color image acquirer configured to acquire a color image; a grayscale image generator configured to generate a first grayscale image from a first color channel in the color image acquired by the color image acquirer and a second grayscale image from a second color channel in the color image acquired by the color image acquirer; and a binary image generator configured to generate a binary image using the first grayscale image generated by the grayscale image generator and the second grayscale image generated by the grayscale image generator.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

Figure 1:
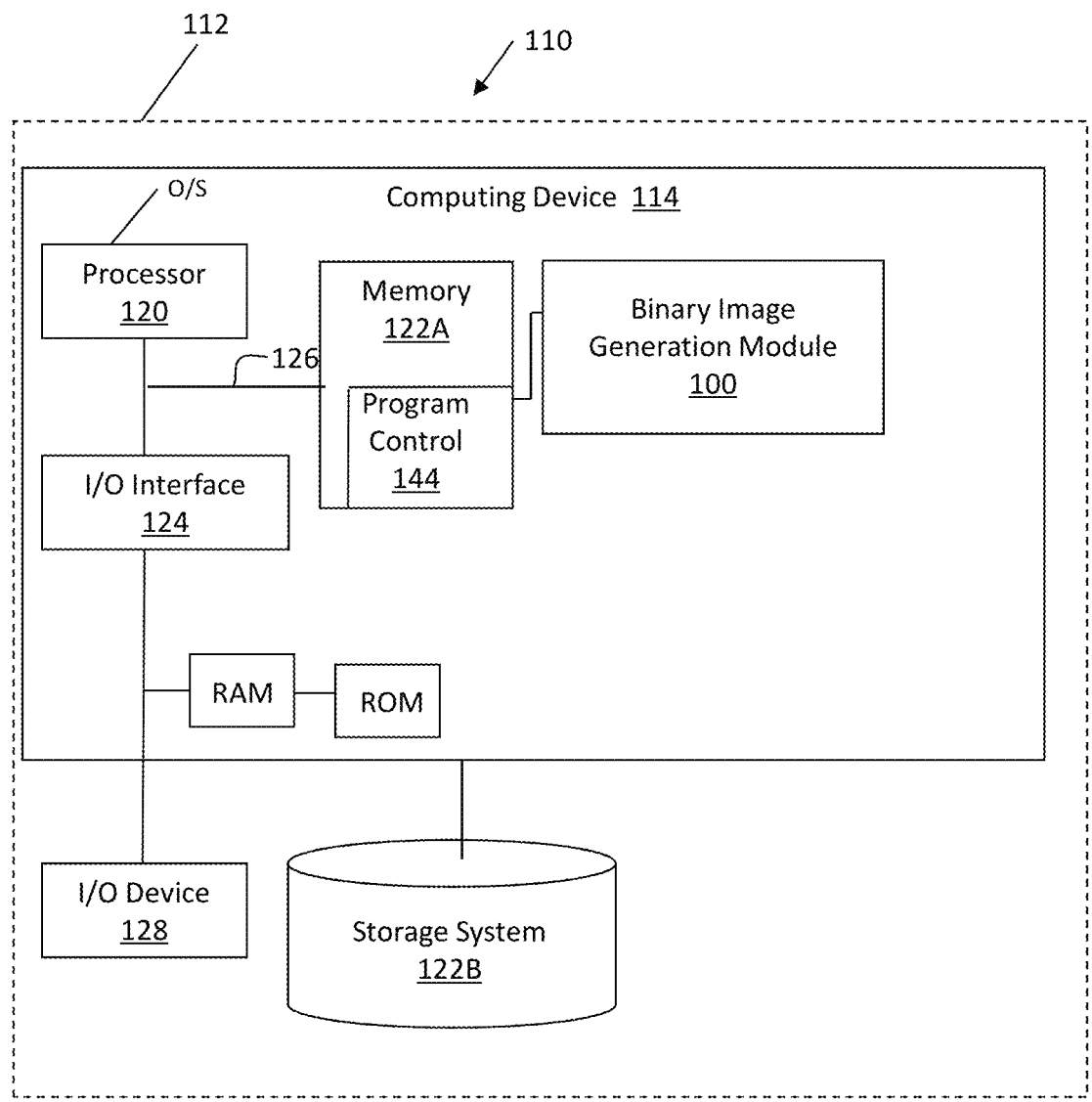
FIG. 1 shows an illustrative environment for implementing the steps in accordance with aspects of the invention.

The present invention generally relates to image processing and, more particularly, to a system and method for generating binary images from color images. Aspects of the invention may create a binary image from a color image by binarizing each of the color channels in the color image to create multiple binary images and then using weights and thresholds to combine the resulting multiple binary images into one binary image. Advantageously, improved binary images or binary images with masked or emphasized features may be generated by binarizing the color channels separately and combining the resulting multiple binary images.

Aspects of the invention may take advantage of varying magnitudes of pixel intensity transitions between color channels (e.g., for a given pixel color transition, each color channel may have a different distance from the corresponding color channel of the neighboring pixel). Weights may be used that allow for each color channel's recorded pixel transitions to have more, less, or equal importance as compared to those of peer color channels, while a combination threshold may be used that allows a user to apply preferences to specific combinations of weighted pixel color channels. For example, if R/G/B weights are set to 35%, 33%, and 32%, respectively, and the combination threshold is set to 100%, in order for a pixel to be black in the output image, the red, green, and blue channel binarizations of that pixel should all also be black. According to an aspect of the present invention, R/G/B weights of 35%, 33%, and 32%, respectively, may reduce image noise and binarization artifacts.

As another example, if R/G/B weights are set to 30%, 59%, and 11%, respectively, and the combination threshold is set to 70%, in order for a pixel to be black in the output binary image, one of the following conditions should apply: (1) red and green channel binarizations both show as black for the given pixel; (2) green and blue channel binarizations both show as black for the given pixel; or (3) red, green, and blue channel binarizations all show as black for the given pixel. For the remaining five combinations, the given pixel in the output image would be set to white.

In one implementation, the system for generating binary images from color images and processes described herein can be implemented in mail sorting and sequencing systems. Postal recognition software used in mail sorting and sequencing systems may work on binary (black/white) images that are sourced from grayscale images; however, color cameras are starting to be used in postal imaging systems. Advantageously, in the systems and processes provided herein, improved binary images of colored envelopes, noisy areas, or obstructed areas of interest (e.g., address information on a mailpiece) may be generated using color images from color cameras. Additionally, the impact of specular reflections may be reduced, extraction of masked data such as security backgrounds may be performed, or binarization may be performed with specific colors in mind.

System Environment

The present invention may be embodied as a system, method, or computer program product. The present invention may take the form of a hardware embodiment, a software embodiment, or a combination of software and hardware. Furthermore, the present invention may take the form of a computer program product embodied in any tangible storage having computer-readable program code embodied in computer-readable storage medium (non-transitory medium). The computer-readable storage medium can contain or store information for use by or in connection with the instruction execution system, apparatus, or device. The computer-readable storage medium may be, for example, an electronic, magnetic, optical, electromagnetic, infrared, or semiconductor system, apparatus, or device or other non-transitory medium, memory, device, or system.

More specific examples of the computer-readable storage medium include the following non-transitory systems, devices and/or memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, the computer readable storage medium, memory, system and/or device is not to be construed as being transitory signals per se. Hereinafter, the computer readable storage medium, memory, system, and/or device is generally referred to as computer-readable storage medium.

FIG. 1 shows an illustrative environment 110 for managing the processes in accordance with the invention. The environment 110 includes a server or other computing system 112 that can perform the processes described herein. In aspects of the present invention, the illustrative environment may be used in a mail sorting and sequencing system, although other uses are also contemplated by the present invention. The computing system 112 includes a computing device 114 which can be resident on or communicate with a network infrastructure or other computing devices.

The computing device 114 includes a processor 120, a memory 122A, an I/O interface 124, and a bus 126. In addition, the computing device 114 includes random access memory (RAM), a read-only memory (ROM), and an operating system (O/S). The computing device 114 is in communication with an external I/O device/resource 128 and a storage system 122B. The I/O device 128 can comprise any device that enables an individual to interact with the computing device 114 (e.g., user interface) or any device that enables the computing device 114 to communicate with one or more other computing devices using any type of communications link or any device that enables the computing device 114 to interact with its environment. By way of example, the I/O device 128 can be a color camera that captures color images of mailpieces.

The processor 120 executes computer program code (e.g., program control 144), which can be stored in the memory 122A and/or the storage system 122B. While executing the computer program code, the processor 120 can read and/or write data to/from the memory 122A, the storage system 122B, and/or the I/O interface 124. The program code 144 executes the processes of the invention such as, for example, generating a binary image from a color image. As discussed in more detail below, the binary image may be generated by binarizing the color channels in the color image to create multiple binary images and then using weights and thresholds to combine the resulting binary images into one binary image.

The computing device 114 includes a binary image generation module 100, which can be implemented as one or more program code in the program control 144 stored in the memory 122A as a separate or combined module. Additionally, the binary image generation module 100 may be implemented as separate dedicated processors or a single or several processors to provide the functionality of this tool. Moreover, it should be understood by those of ordinary skill in the art that the binary image generation module 100 is used as a general descriptive term for providing the features and/or functions of the present invention, and that the binary image generation module 100 may comprise many different components such as, for example, the components and/or infrastructure described and shown with reference to FIG. 1.

In aspects of the present invention, the binary image generation module 100 is operative and/or configured to generate a binary image of a mailpiece or other object by binarizing the color channels in a color image of the mailpiece or other object. This is generally accomplished by providing the following functionality: (1) acquiring the color image; (2) generating a first grayscale image from a first color channel in the color image, a second grayscale image from a second color channel in the color image, and a third grayscale image from a third color channel in the color image; and (3) generating the binary image using the first grayscale image, the second grayscale image, and the third grayscale image.

According to an aspect of the present invention, generating the binary image may include generating a binary image of the first color channel by binarizing the first grayscale image, a binary image of the second color channel by binarizing the second grayscale image, and a binary image of the third color channel by binarizing the third grayscale image. According to embodiments, generating the binary image may further include combining the binary image of the first color channel, the binary image of the second color channel, and the binary image of the third color channel to generate the binary image, optionally using a first predetermined weight for the first color channel, a second predetermined weight for the second color channel, and a third predetermined weight for the third color channel.

According to an aspect of the present invention, combining to generate the binary image may include, for each pixel in the binary image, determining a combined pixel value by combining corresponding pixel values in the binary image of the first color channel, the binary image of the second color channel, and the binary image of the third color using the first predetermined weight, the second predetermined weight, and the third predetermined weight, respectively. For each pixel in the binary image, if the combined pixel value is less than a predetermined threshold, a first value may be assigned to the pixel, and if the combined pixel value is greater than or equal to the predetermined threshold, a second value may be assigned to the pixel. In an embodiment, the first value may be a white value and the second value may be a black value.

IMPLEMENTATIONS

FIGS. 2A-2C, 3A-3D, 4A-4C, 5A, 5B, 6A-6C, 7, and 8 show representations of different techniques (processes) implemented by the systems and processes described herein. These figures can also represent exemplary flows for respective processing steps in accordance with aspects of the present invention. The exemplary representations can be implemented as a system, a method, and/or a computer program product and related functionality implemented on the computing system of FIG. 1. Accordingly, the processes associated with each representative figure can be implemented by special purpose hardware-based systems that perform the specified functions or acts or carry out combinations of special purpose hardware and computer instructions. It is also contemplated that any combination of techniques described herein can be used together in parallel or serially.

Figure 2A:
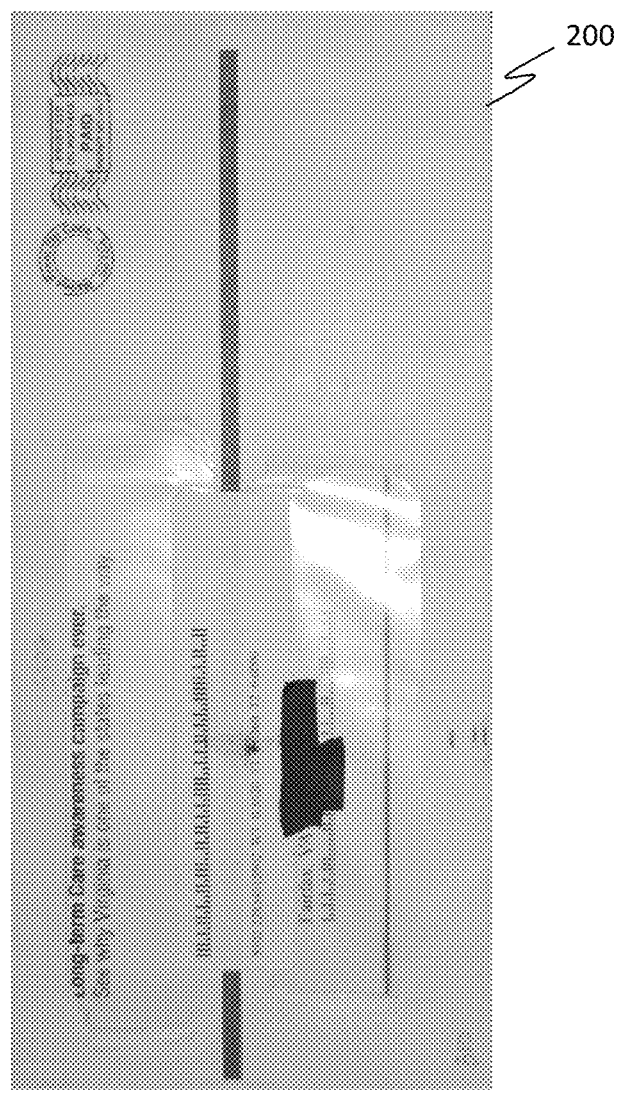
FIG. 2A shows a representation of an input color image.
Figure 2B:
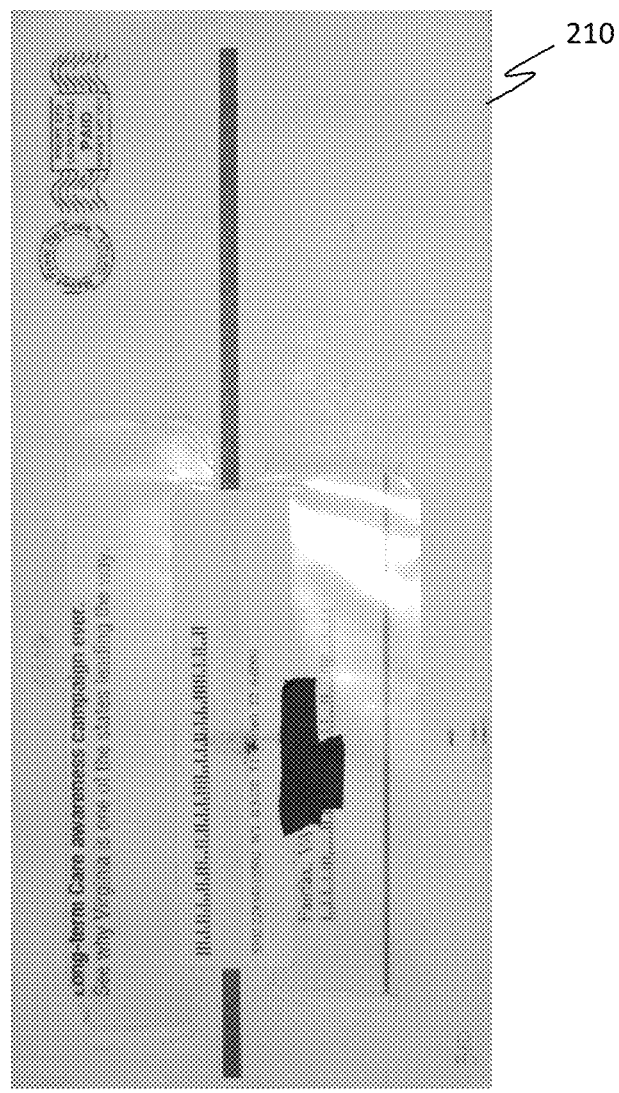
FIG. 2B shows a representation of a combined grayscale image generated from the input color image.
Figure 2C:
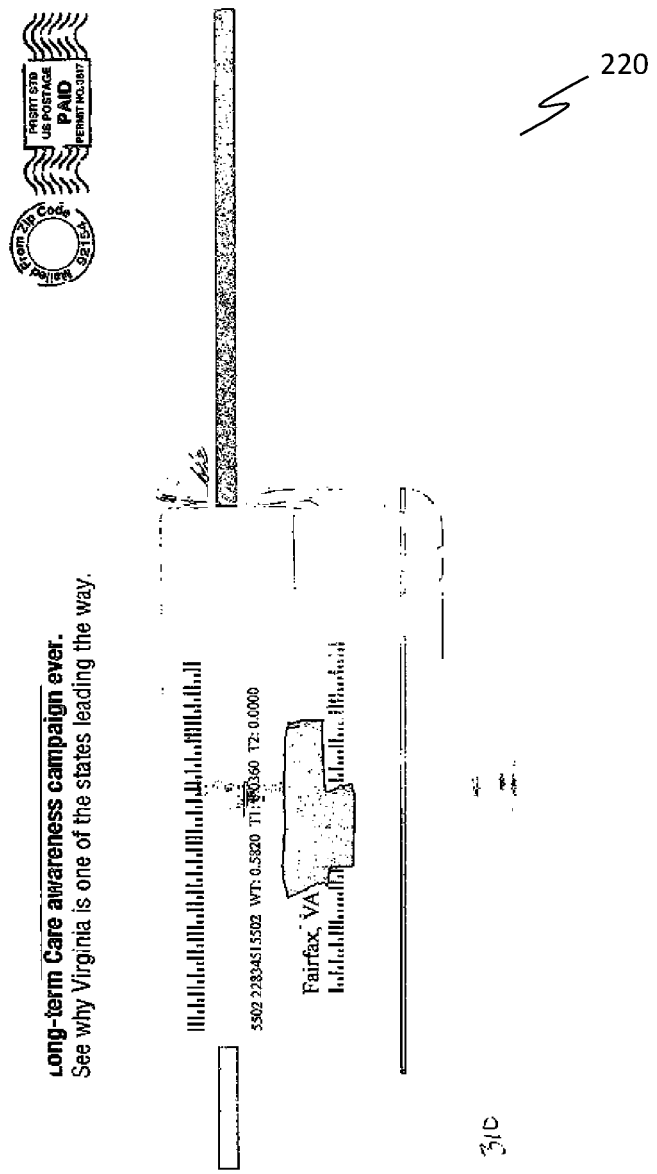
FIG. 2C shows a representation of a binary image generated from the combined grayscale image.

FIGS. 2A, 2B, and 2C show representations of images at various stages of a related art binarization process. More specifically, FIG. 2A shows a representation of an input color image 200 used in a related art binarization process. The input color image 200 may be a color image of a mailpiece or other object. The input color image 200 may be acquired from a color camera, a color scanner, or any other device that creates, stores, retrieves, or outputs color images.

FIG. 2B shows a representation of a combined grayscale image 210 generated from the input color image 200 by a weighted combination of each of the multiple color intensity channels in the input color image 200 into a single grayscale intensity channel. That is, the combined grayscale image 210 may be generated by, for each pixel in the input color image 200, combining using weights the value of each color intensity channel for the pixel to create a combined pixel value (i.e., a value for the single grayscale intensity channel) for the combined grayscale image 210. For example, a color intensity value for a red color channel, a color intensity value for a green color channel, and a color intensity value for a blue color channel may be combined to create an intensity value for a single grayscale intensity channel. Each color channel may be weighted differently, or the same weight may be given to each color channel in the combining.

FIG. 2C shows a representation of a binary image 220 generated from the combined grayscale image 210 by a related art binarization process. A binarization algorithm may be applied to the grayscale image 210 to generate the binary image 220.

According to the related art binarization process, the intensity levels of each of the color channels (e.g., red, green, and blue) are combined into a single intensity map. However, this method can cause important information to be obscured, and can also cause the introduction of undesired information. For example, assume there are two neighboring pixels with RGB color values (55, 141, 30) and (65, 100, 50). If these pixels are converted to grayscale using color channel weights of (30%, 59%, 11%), the resulting pixel intensities are (55*0.3, 141*0.59, 30*0.11)=(17, 83, 3)=103 and (65*0.3, 100*0.59, 50*0.11)=(20, 59, 6)=85. Now, if the binarization algorithm has a threshold intensity distance requirement for indicating a transition (i.e., pixel transition threshold) of 15, an edge would be formed between these two pixels (i.e., one would be black and the other white) in the related art binarization process.

Figure 3A:
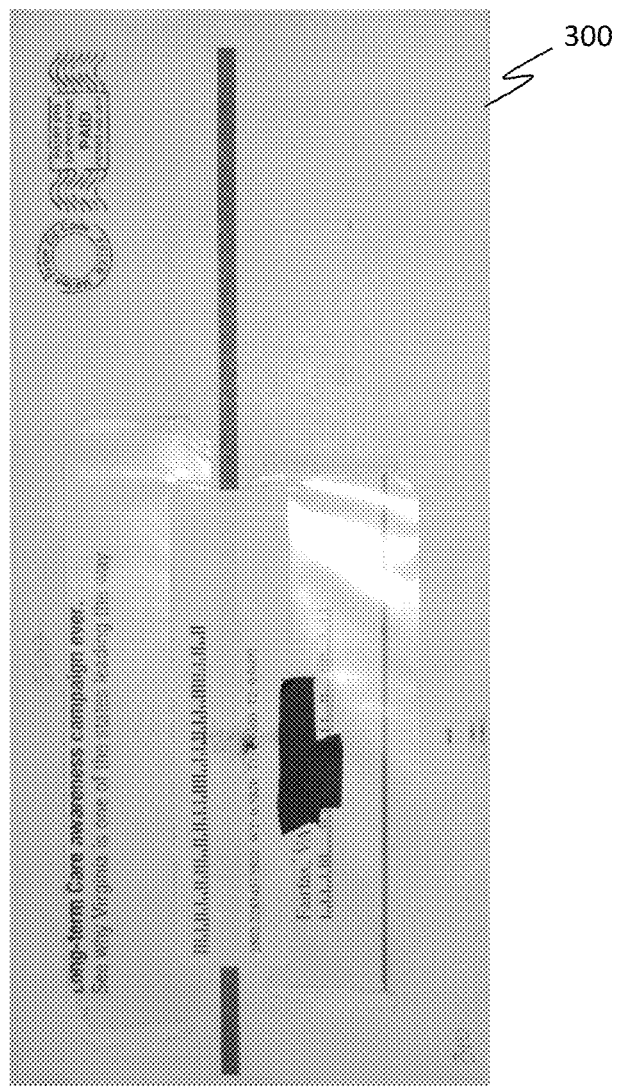
FIG. 3A shows a representation of an input color image according to an aspect of the present disclosure.

FIGS. 3A, 3B, 3C, and 3D show representations of images at various stages of a binarization process according to an aspect of the present invention. More specifically, FIG. 3A shows a representation of an input color image 300 of a mailpiece or other object. The input color image 300 may be acquired from a color camera, a color scanner, or any other device that creates, stores, retrieves, or outputs color images.

Figure 3B:
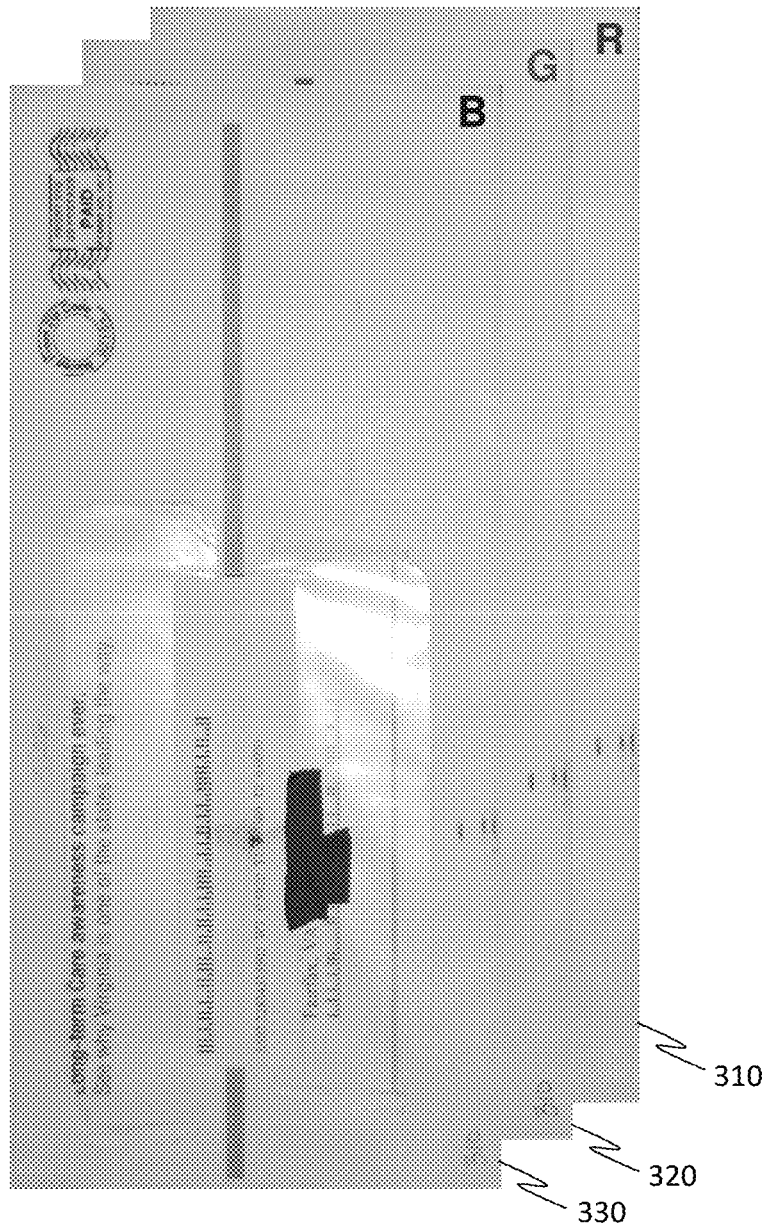
FIG. 3B shows a representation of grayscales images for each color channel generated from the input color image according to an aspect of the present disclosure.

FIG. 3B shows a representation of grayscales images 310, 320, 330 for each color channel generated from the input color image 300. The grayscale image 310 may be generated from the red color channel in the input color image 300, the grayscale image 320 may be generated from the green color channel in the input color image 300, and the grayscale image 330 may be generated from the blue color channel in the input color image 300. The grayscale image 310 may be created by converting a color intensity value for the red color channel in the input color image 300 to an intensity value for a grayscale intensity channel. The grayscale image 320 may be created by converting a color intensity value for the green color channel in the input color image 300 to an intensity value for a grayscale intensity channel. The grayscale image 330 may be created by converting a color intensity value for the blue color channel in the input color image 300 to an intensity value for a grayscale intensity channel.

According to another aspect of the present invention, different color channels (including different numbers of color channels) may be used and a different number of grayscale images may be generated based upon the number of color channels. For example, two color channels may be used, and two grayscale images may be generated, one from each color channel. As another example, four color channels may be used (e.g., cyan, magenta, yellow, and black in the case of CMYK), and four grayscale images may be generated, one from each color channel. Other examples of color channels that may be used include, but are not limited to, HSV channels (hue, saturation, and value) and YUV channels.

According to an aspect of the present invention, in the conversion of the color intensity values for the red, green, and blue color channels to the intensity value for the grayscale intensity channel during the generation of the grayscale images 310, 320, 330, weights may be applied. Different weights may be used for each of the color channels. Alternatively, the same weight may be used for each of the color channels. For example, for a pixel in the grayscale image 330, an intensity value for the grayscale intensity channel may be determined by taking the result of dividing the color intensity value for the blue color channel in the input color image 300 by the maximum color intensity value and multiplying by 0.7, in the case of a 70% weight.

Figure 3C:
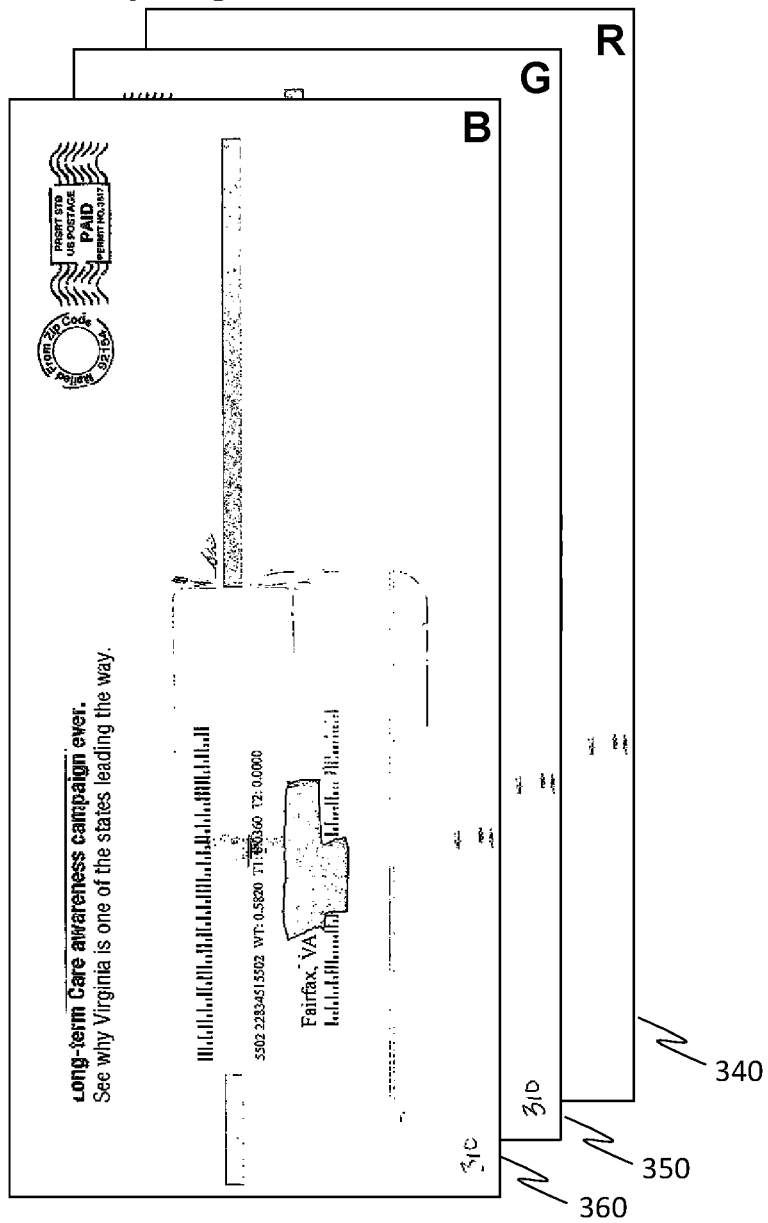
FIG. 3C shows a representation of binary images for each color channel generated from the grayscale images for each color channel according to an aspect of the present disclosure.

FIG. 3C shows a representation of a binary image 340 generated from the grayscale image 310 generated from the red color channel, a binary image 350 generated from the grayscale image 320 generated from the green color channel, and a binary image 360 generated from the grayscale image 330 generated from the blue color channel. Alternatively, if different color channels are used, a binary image may be generated from each of the grayscale images corresponding to each of the color channels. A binarization algorithm may be applied to the grayscale image 310 to generate the binary image of the red color channel 340. The binarization algorithm may be applied to the grayscale image 320 to generate the binary image of the green color channel 350. The binarization algorithm may be applied to the grayscale image 330 to generate the binary image of the blue color channel 360. According to an aspect of the present invention, any binarization algorithm may be used which is known to those of ordinary skill in the art such that no further explanation is required for a complete understanding of the invention. Binarization algorithms which may be used include, but are not limited to, Fixed Thresholding, Otsu, and Kittler, as is known in the art. A single binarization algorithm or multiple binarization algorithms may be used (e.g., a different binarization algorithm may be used for each color channel) in implementing the processes described herein. Further according to an aspect of the present invention, the binarization algorithm may use transitions between intensity levels of the input grayscale images 310, 320, 330 to determine whether a given pixel is black or white. By binarizing each color channel separately, the intensity difference between any given set of pixels can be considered individually by color channel.

Figure 3D:
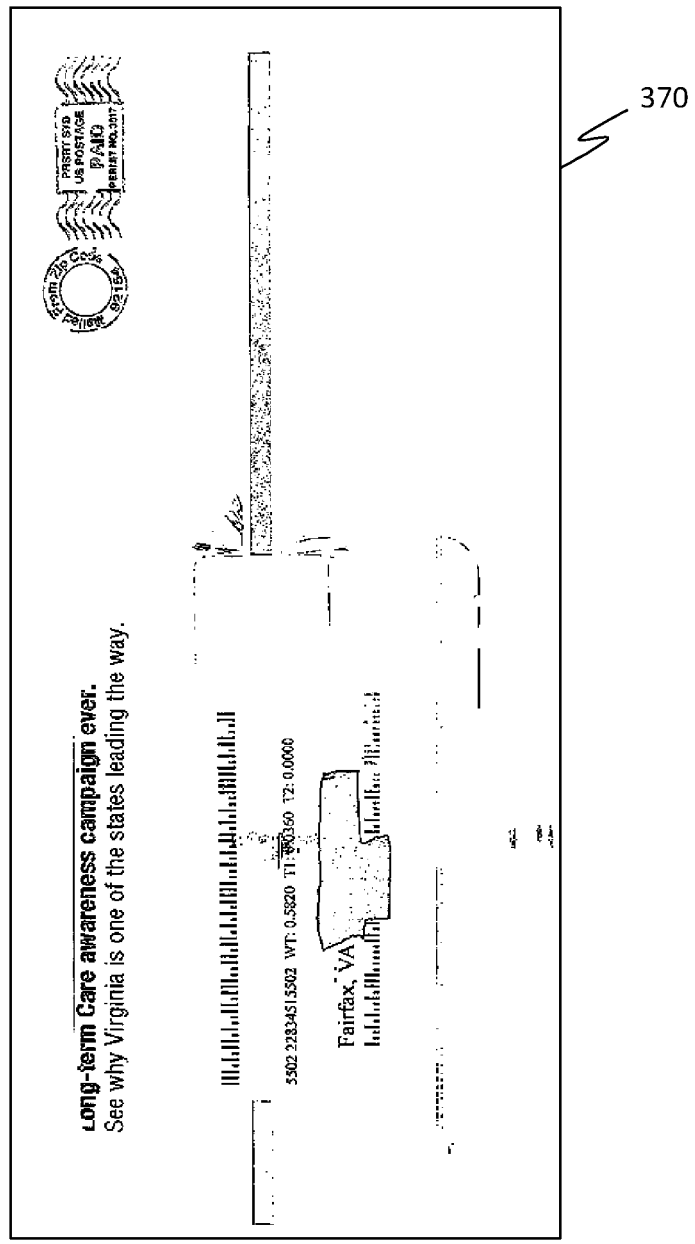
FIG. 3D shows a representation of a binary image generated from the binary images for each color channel according to an aspect of the present disclosure.

FIG. 3D shows a representation of a binary image 370 generated from the binary images 340, 350, 360 for each color channel according to an aspect of the present invention. The binary image of the red color channel 340, the binary image of the green color channel 350, and the binary image of the blue color channel 360 may be combined to generate the binary image 370. Alternatively, if different color channels are used, the binary images for each of the color channels may be used to generate the binary image 370.

According to an aspect of the present invention, a combined pixel value is calculated from a corresponding pixel in each of the binary images 340, 350, 360. In calculating the combined pixel value, equal weight may be used for each of the binary image of the red color channel 340, the binary image of the green color channel 350, and the binary image of the blue color channel 360. Alternatively, a first predetermined weight may be used for the binary image of the red color channel 340, a second predetermined weight may be used for the binary image of the green color channel 350, and a third predetermined weight may be used for the binary image of the blue color channel 360 during the combining.

The combined pixel value is then compared to a pixel combination threshold. If the combined pixel value is less than the pixel combination threshold, the pixel may not show a transition, and a first value (e.g., 0 or white) may be assigned to the pixel. If the combined pixel value is equal to or greater than the pixel combination threshold, the pixel may show a transition, and a second value (e.g., 1 or black) may be assigned to the pixel.

According to an aspect of the present invention, by binarizing each color channel separately, intensity difference between any given set of pixels may be considered individually. For example, the binarization process using the same two neighboring pixels with RGB color values (55, 141, 30) and (65, 100, 50), the same color channel weights, and the same pixel transition threshold as discussed herein may yield a different result than that of the related art binarization process. For example, according to an aspect of the present invention, each color channel is now compared individually: 55 vs. 65, 141 vs. 100, 30 vs. 50, as compared to a conventional binarization process which compares the result of combining all of the color channels into a single grayscale channel. Applying the same pixel transition threshold value of 15, the resulting binary transitions are as follows: (0, 1, 1) (since 65−55=10<15; 141−100=41≥15; 50−30=20≥15). Applying the same color channel weights of (30%, 59%, 11%), a combined pixel value is calculated as (0, 1, 1)*(0.30, 0.59, 0.11)=(0, 0.59, 0.11)=0+0.59+0.11=0.70. If a pixel combination threshold of 71% (0.71) or higher is defined, this pixel will not show a transition, and a first value (e.g., 0 or white) will be assigned to the pixel. If a pixel combination threshold of 70% (0.70) or lower is defined, this pixel will show a transition, and a second value (e.g., 1 or black) will be assigned to the pixel.

Figure 4A:
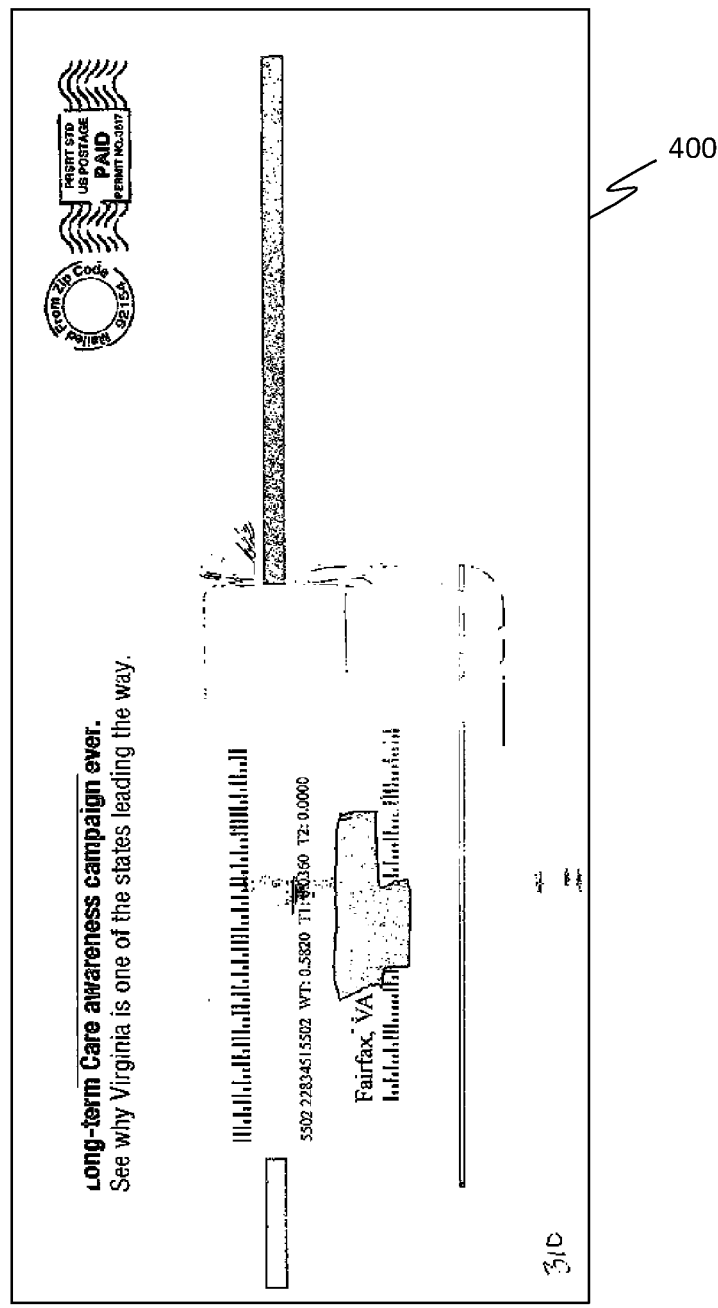
FIG. 4A shows a representation of a binary image generated from a combined grayscale image.
Figure 4B:
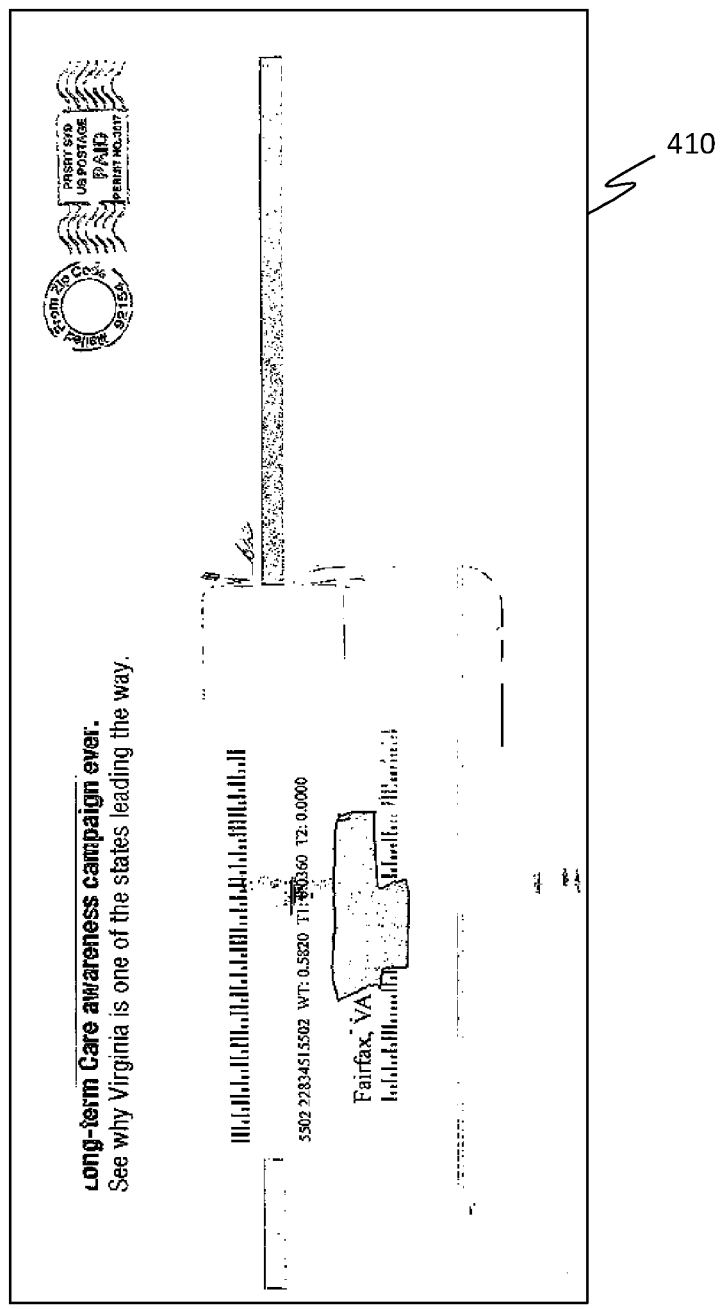
FIG. 4B shows a representation of a binary image generated from binary images for each color channel according to an aspect of the present disclosure.
Figure 4C:
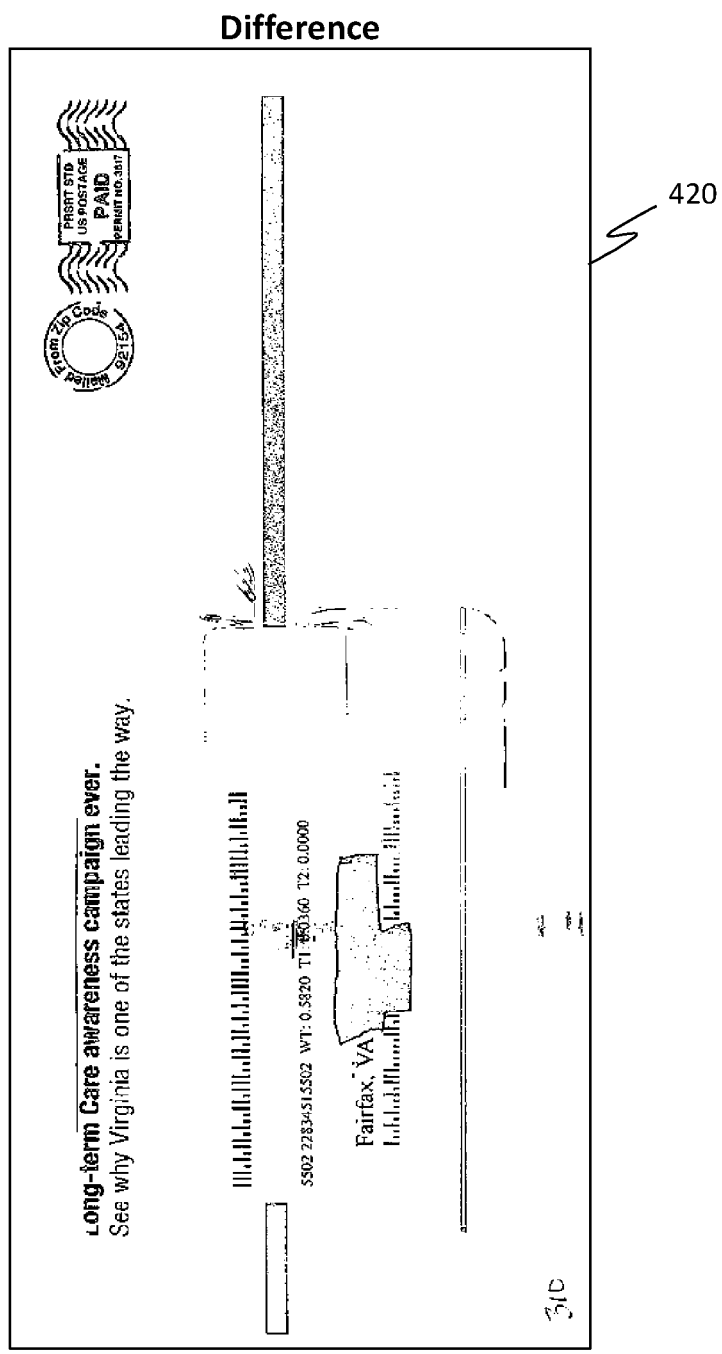
FIG. 4C shows a representation of a difference between the binary image generated from the combined grayscale image and the binary image generated from the binary images for each color channel according to an aspect of the present disclosure.

FIG. 4A shows a representation of a binary image 400 generated from the combined grayscale image 210 shown in FIG. 2B, in the related art binarization process. FIG. 4B shows a representation of a binary image 410 generated from binary images for each color channel 340, 350, 360 shown in FIG. 3C. FIG. 4C shows a representation of a difference between the binary image 400 generated from the combined grayscale image 210 and the binary image 400 generated from the binary images for each color channel 340, 350, 360. Here, it is clearly seen that implementing the present invention will result in an improved binary image 410.

Figure 5A:
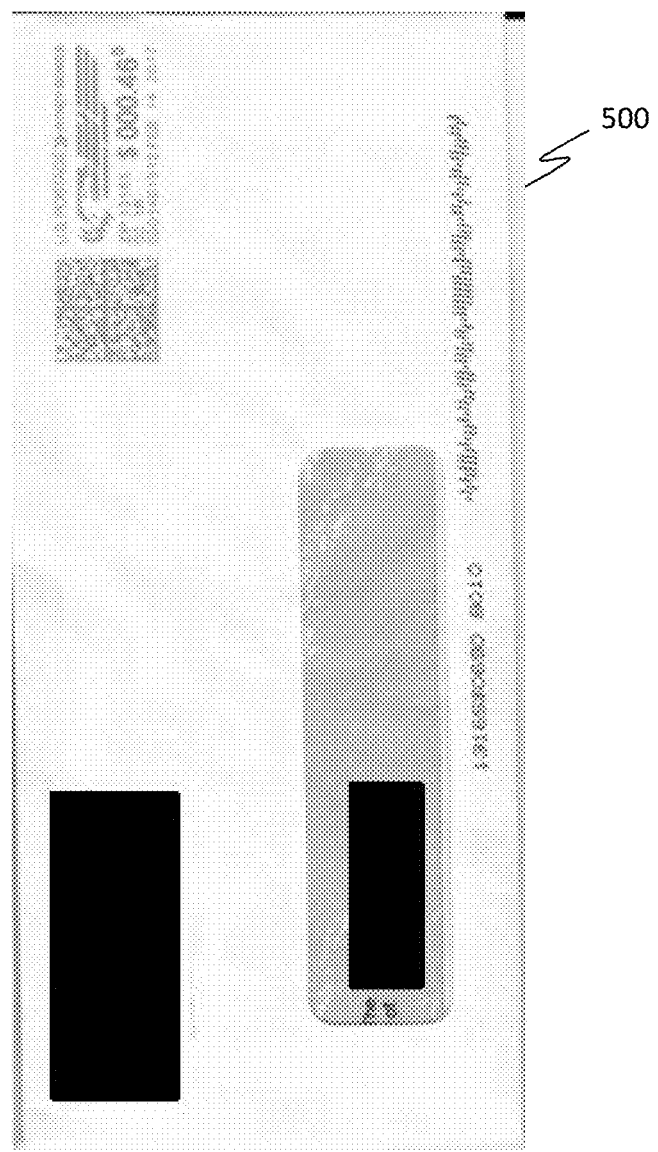
FIG. 5A shows a representation of an input color image according to an aspect of the present disclosure.
Figure 5B:
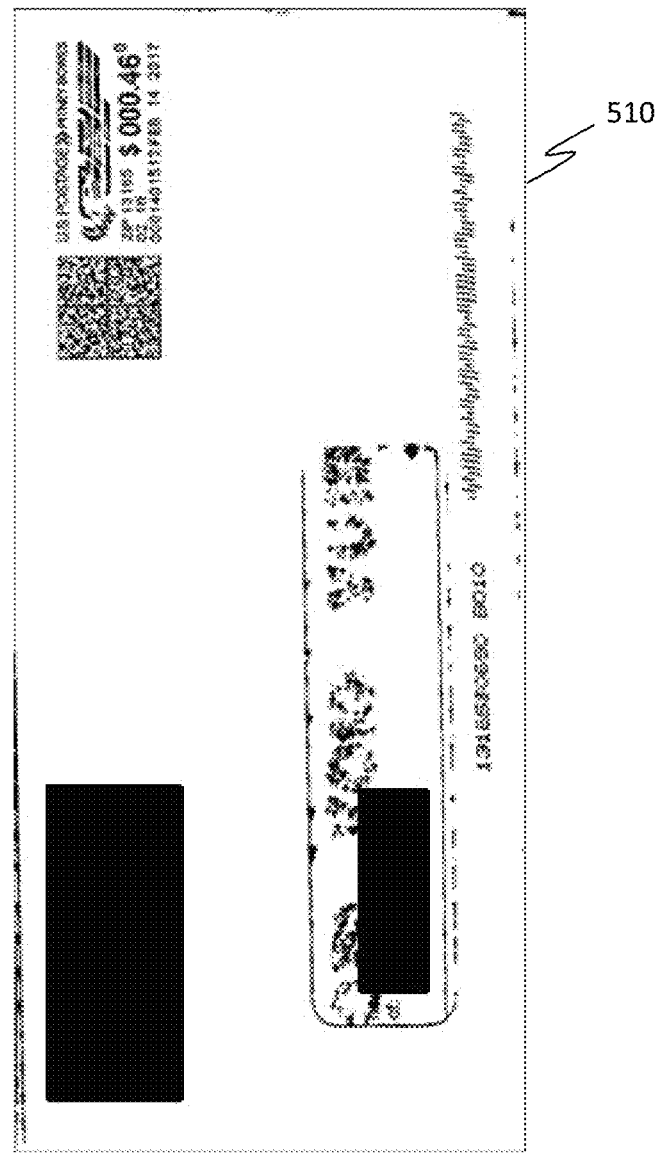
FIG. 5B shows a representation of a binary image with a watermark generated from binary images for each color channel according to an aspect of the present disclosure.

According to an additional aspect of the present invention, the color channel weights and/or the pixel combination threshold may be varied in order to emphasize or deemphasize various aspects of the images. For example, FIG. 5A shows a representation of an input color image 500. The color channel weights and/or the pixel combination threshold may be selected such that certain aspects of the input color image 500 are more or less prominent in an output binary image. For example, elements of a particular color in the input color image 500 may be emphasized or deemphasized in the output binary image based upon the selection of the color channel weights and/or the pixel combination threshold. FIG. 5B shows a representation of a binary image 510 in which the color channel weights and/or the pixel combination threshold have been selected such that a watermark is emphasized.

Figure 6A:
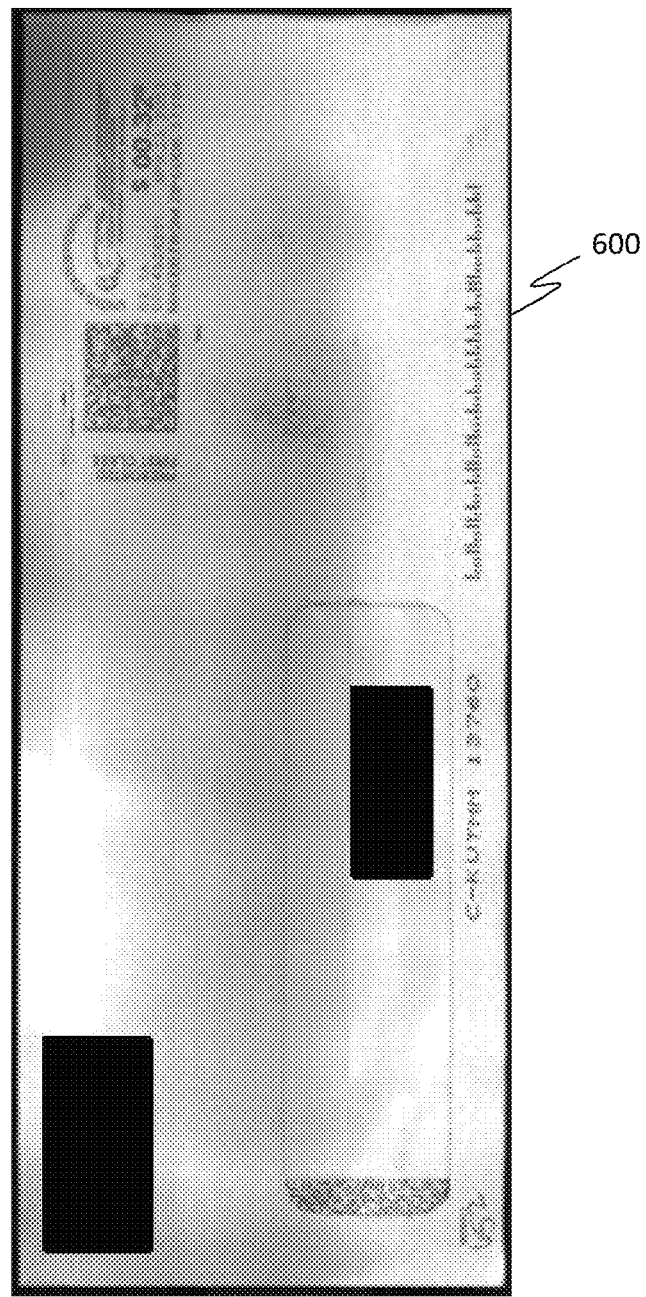
FIG. 6A shows a representation of an input color image according to an aspect of the present disclosure.
Figure 6B:
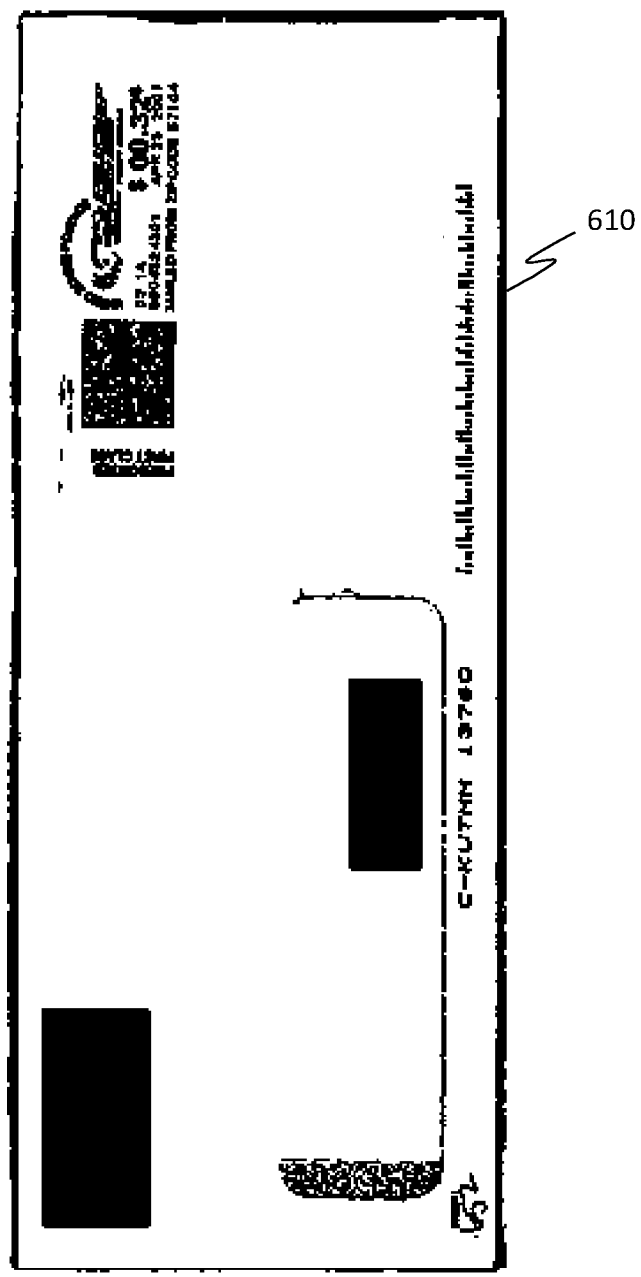
FIG. 6B shows a representation of a binary image with an emphasized feature generated from binary images for each color channel according to an aspect of the present disclosure.
Figure 6C:
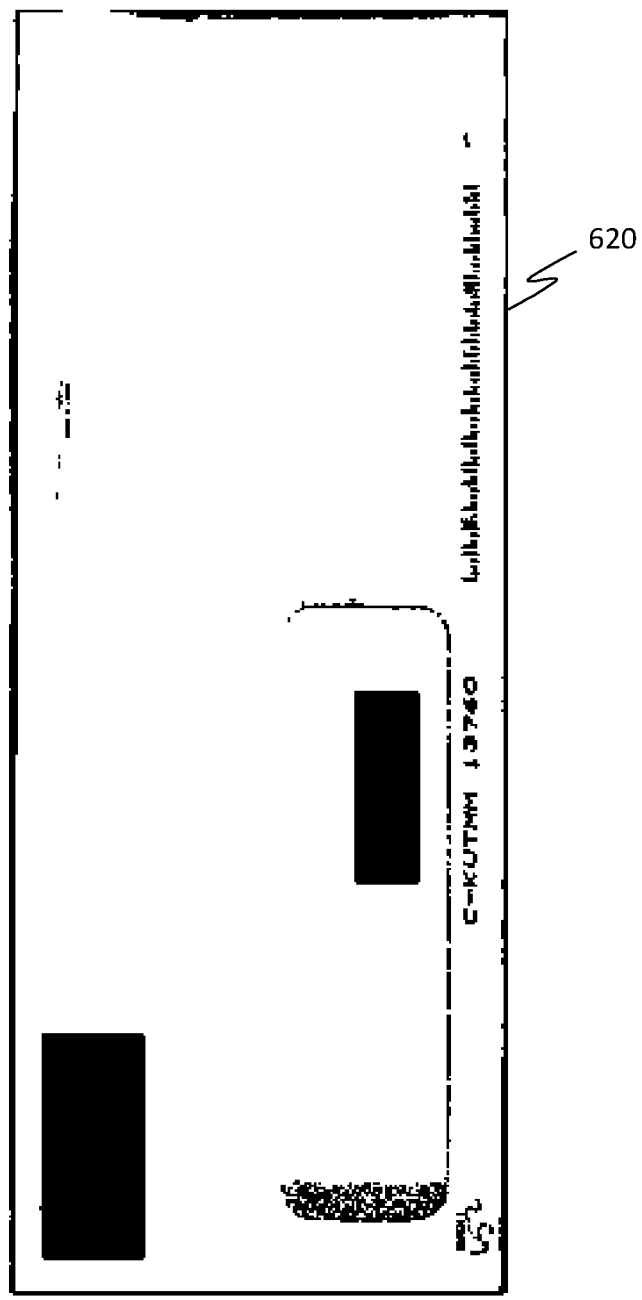
FIG. 6C shows a representation of a binary image with a masked feature generated from binary images for each color channel according to an aspect of the present disclosure.

As another example, FIG. 6A shows a representation of an input color image 600. The color channel weights and/or the pixel combination threshold may be selected such that a postmark is emphasized in a binary image 610 as shown in FIG. 6B. Alternatively, the color channel weights and/or the pixel combination threshold may be selected such that the postmark is deemphasized in a binary image 620 as shown in FIG. 6C.

Figure 7:
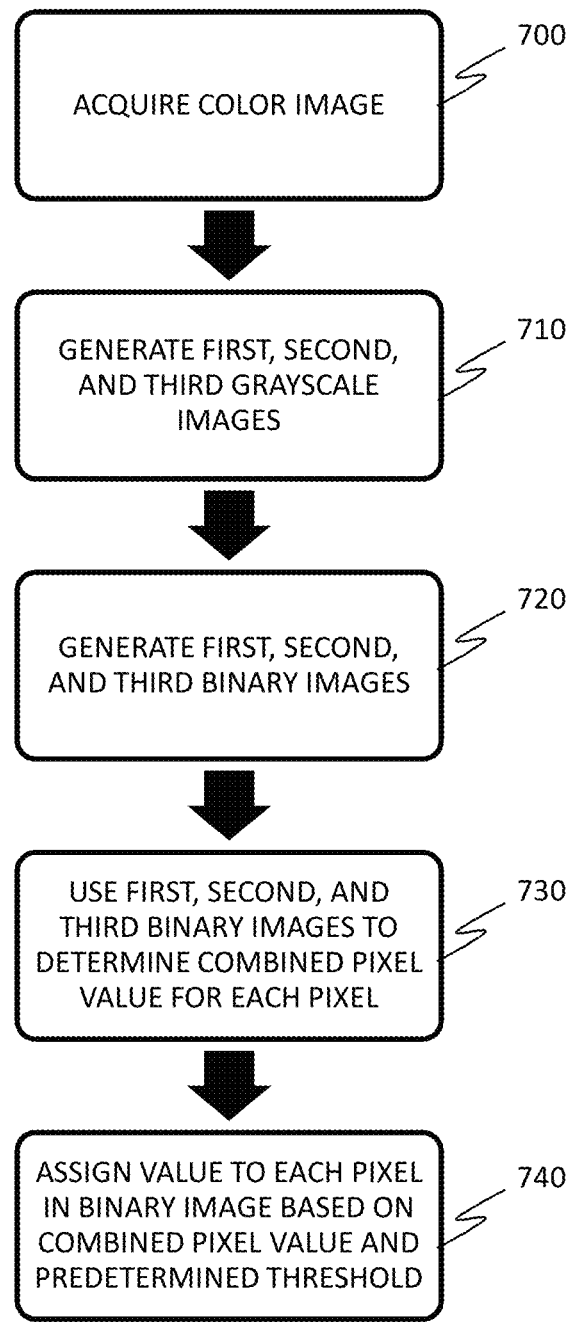
FIG. 7 shows a flowchart of a method in accordance with aspects of the present disclosure.

FIG. 7 depicts exemplary methods in accordance with aspects of the invention. The steps of the method may be performed in the system of FIG. 1 and are described with reference to the elements and steps described with respect to FIGS. 2A-2C, 3A-3D, 4A-4C, 5A, 5B, and 6A-6C.

At step 700, the system acquires a color image 300 of a mailpiece or other object. As discussed herein, the color image 300 may be acquired from a color camera, a color scanner, or any other device that creates, stores, retrieves, or outputs color images. At step 710, the system generates a first grayscale image 310 from a red color channel in the color image 300, a second grayscale image 320 from a green color channel in the input color image 300, and a third grayscale image 330 from a blue color channel in the input color image 300, as discussed. At step 720, the system generates a first binary image 340 from the grayscale image 310 generated from the red color channel, a second binary image 350 generated from the grayscale image 320 generated from the green color channel, and a third binary image 360 generated from the grayscale image 330 generated from the blue color channel, as discussed. At step 730, the system uses the first binary image 340, the second binary image 350, and the third binary image 360 to determine a combined pixel value for each pixel. A combined pixel value is calculated from a corresponding pixel in each of the binary images 340, 350, 360, as already discussed herein. At step 740, a value is assigned to each pixel based on the combined pixel value and a predetermined pixel combination threshold, as discussed above, thus generating the binary image 370.

Figure 8:
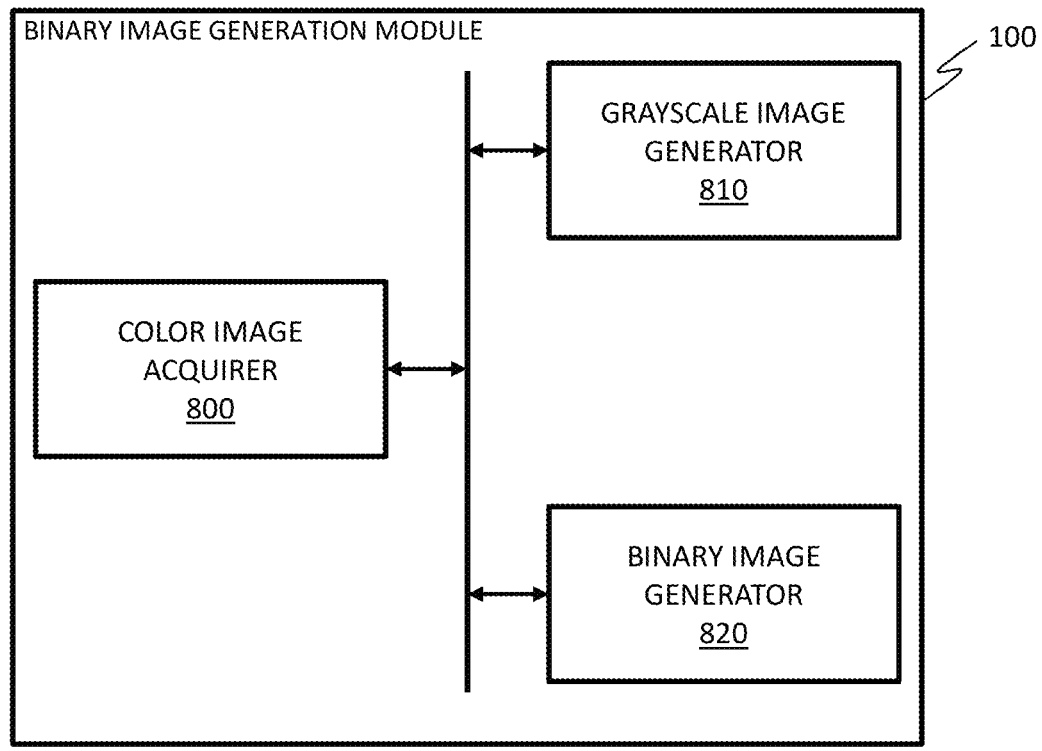
FIG. 8 shows a block diagram of a binary image generation module in accordance with aspects of the present disclosure.

FIG. 8 shows a block diagram of a binary image generation module 100 in accordance with aspects of the present disclosure. The binary image generation module 100 shown in FIG. 8 may be the binary image generation module 100 in the computing device 114 shown in FIG. 1. The binary image generation module 100 may include a color image acquirer 800, a grayscale image generator 810, and a binary image generator 820. The color image acquirer 800 may acquire the color image 300 from a color camera, a color scanner, or any other device that creates, stores, retrieves, or outputs color images, as discussed herein. The grayscale image generator 810 may generate a first grayscale image 310 from a red color channel in the color image 300 acquired by the color image acquirer 800, a second grayscale image 320 from a green color channel in the input color image 300 acquired by the color image acquirer 800, and a third grayscale image 330 from a blue color channel in the input color image 300 acquired by the color image acquirer 800, as described herein.

The binary image generator 820 may generate a first binary image 340 from the grayscale image 310 generated from the red color channel by the grayscale image generator 810, a second binary image 350 generated from the grayscale image 320 generated from the green color channel by the grayscale image generator 810, and a third binary image 360 generated from the grayscale image 330 generated from the blue color channel by the grayscale image generator 810, as described herein. The binary image generator 820 may also use the first binary image 340, the second binary image 350, and the third binary image 360 generated by the binary image generator 820 to determine a combined pixel value for each pixel. A combined pixel value is calculated from a corresponding pixel in each of the binary images 340, 350, 360, as already discussed herein. The binary generator 820 may further assign a value to each pixel based on the combined pixel value and a predetermined pixel combination threshold, as discussed above, thus generating the binary image 370.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A method comprising:
   acquiring a color image;
   generating a first grayscale image from a first color channel in the color image and a second grayscale image from a second color channel in the color image;
   generating a first color channel binary image by binarizing the first grayscale image and generating a second color channel binary image by binarizing the second grayscale image; and
   generating one binary image by combining the first color channel binary image with a first predetermined weight and the second color channel binary image with a second predetermined weight, and using a pixel combination threshold to combine the binary images into the one binary image,
   wherein the combining, for each pixel in the one binary image, comprises:
      determining a combined pixel value by combining corresponding pixel values of the weighted first color channel binary image and of the weighted second color channel binary image, the combined pixel value corresponding to a value for a single grayscale intensity channel, and
      comparing the combined pixel value to the pixel combination threshold such that a value of white is assigned to the pixel when the combined pixel value is less than the pixel combination threshold and a value of black is assigned to the pixel when the combined pixel value is equal to or greater than the pixel combination threshold, and
   wherein the binarizing of each color channel separately results in an intensity difference between any given set of corresponding pixels of the first color channel binary image and the second color channel binary image.

2. The method according to claim 1, wherein the predetermined threshold is 100%.

3. The method according to claim 1, wherein the predetermined threshold is 70%.

4. The method according to claim 1, further comprising: generating a third grayscale image from a third color channel in the color image and a fourth grayscale image from a fourth color channel in the color image; and generating a third color channel binary image by binarizing the third grayscale image and a fourth color channel binary image by binarizing the fourth grayscale image, and wherein:

the first color channel is cyan, the second color channel is magenta, the third color channel is yellow, and the fourth color channel is black, and the generating the binary image further comprises combining the third color channel binary image using a third predetermined weight and the fourth color channel binary image using a fourth predetermined weight.

5. The method according to claim 1, further comprising: generating a third grayscale image from a third color channel in the color image; and generating a third color channel binary image by binarizing the third grayscale image, and wherein the generating the binary image further comprises combining the third color channel binary image using a third predetermined weight.

6. The method according to claim 5, wherein:

the first color channel is red and the first predetermined weight is 35%, the second color channel is green and the second predetermined weight is 33%, and the third color channel is blue and the third predetermined weight is 32%.

7. The method according to claim 5, wherein:

the first color channel is red and the first predetermined weight is 30%, the second color channel is green and the second predetermined weight is 59%, and the third color channel is blue and the third predetermined weight is 11%.

8. A computer program product comprising a computer readable storage medium having program instructions embodied therewith, the program instructions executable by a computer device to cause the computer device to:

acquire a color image;

generate a grayscale image from each of at least two color channels in the color image;

generate binary images of each of the at least two color channels by binarizing each of the grayscale images; and generate a binary image by combining the binary images of each of the at least two color channels, using different predetermined weights for each of the at least two color channels, wherein the combining to generate the binary image comprises, for each pixel in the binary image, determining a combined pixel value corresponding to a value for a single grayscale intensity channel, by combining corresponding pixel values in the binary images of each of the at least two weighted color channels, and wherein, for each pixel in the binary image:

in response to the combined pixel value being less than or equal to a predetermined threshold, a first value is assigned to the pixel;

in response to the combined pixel value being greater than the predetermined threshold, a second value is assigned to the pixel, and wherein the binarizing of each color channel separately results in an intensity difference between any given set of corresponding pixels of the binary images of the at least two color channels.

9. A computing device comprising:

at least one hardware processor;

a color image acquirer configured to acquire a color image;

a grayscale image generator configured to generate a first grayscale image from a first color channel in the color image acquired by the color image acquirer and a second grayscale image from a second color channel in the color image acquired by the color image acquirer; and a binary image generator configured to:

generate a first color channel binary image by binarizing the first grayscale image generated by the grayscale image generator and a second color channel binary image by binarizing the second grayscale image generated by the grayscale image generator; and generate a binary image by combining at least the first color channel binary image using a first predetermined weight and the second color channel binary image using a second predetermined weight that is different from the first predetermined weight, wherein the binary image generator is further configured, for each pixel in the binary image, to determine a combined pixel value corresponding to a value for the single grayscale intensity channel, by combining corresponding pixel values in the weighted first color channel binary image and the weighted second color channel binary image, and wherein the binary image generator is further configured, for each pixel in the binary image, to:

in response to the combined pixel value being less than or equal to a predetermined threshold, assign a first value to the pixel; and in response to the combined pixel value being greater than the predetermined threshold, assign a second value to the pixel, and wherein the binarizing of each color channel separately results in an intensity difference between any given set of corresponding pixels of the first color channel binary image and the second color channel binary image.

* * * * *